United States Patent
Schmidt et al.

(10) Patent No.: US 10,760,760 B2
(45) Date of Patent: Sep. 1, 2020

(54) ILLUMINATION APPARATUS, VEHICLE COMPONENT AND VEHICLE

(71) Applicant: SMR Patents S.à.r.l., Luxembourg (LU)

(72) Inventors: Oliver Schmidt, Stuttgart (DE); Daniel Fritz, Stuttgart (DE); Jacob Messenger, Stuttgart (DE); Torsten Weingärtner, Stuttgart (DE); Fabian Sehn, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 16/552,126

(22) Filed: Aug. 27, 2019

(65) Prior Publication Data

US 2019/0383459 A1    Dec. 19, 2019

Related U.S. Application Data

(63) Continuation-in-part of application No. 16/181,917, filed on Nov. 6, 2018, now Pat. No. 10,391,933, (Continued)

(30) Foreign Application Priority Data

Sep. 15, 2015    (DE) .................... 20 2015 104 894 U

(51) Int. Cl.
*F21S 41/64*    (2018.01)
*F21S 43/14*    (2018.01)
(Continued)

(52) U.S. Cl.
CPC .......... *F21S 41/645* (2018.01); *B60Q 1/0023* (2013.01); *B60Q 1/2619* (2013.01);
(Continued)

(58) Field of Classification Search
CPC ... B60Q 1/2665; B60Q 2400/50; F21S 43/37; F21S 43/40; F21S 43/26; G03B 21/28
See application file for complete search history.

(56) References Cited

U.S. PATENT DOCUMENTS

2003/0038928 A1   2/2003  Alden
2005/0117364 A1*  6/2005  Rennick ............... B60R 1/1207
                                                          362/540
(Continued)

FOREIGN PATENT DOCUMENTS

DE            10134594        1/2003
DE         102004050600       4/2006
(Continued)

OTHER PUBLICATIONS

Extended European Search Report, Application No. EP 16188657.7, dated Feb. 14, 2017.
(Continued)

*Primary Examiner* — Mary Ellen Bowman
(74) *Attorney, Agent, or Firm* — Jones Day

(57) ABSTRACT

An illumination device includes at least one illuminant for emitting light, and an optical reflection unit, including at least one reflective surface, and at least one surface including at least one mask, where the optical reflection unit is configured to receive the light emitted from the at least one illuminant and project at least one of an image, a symbol, a logo, and a legend on a projection surface.

30 Claims, 8 Drawing Sheets

Related U.S. Application Data which is a continuation-in-part of application No. 15/262,396, filed on Sep. 12, 2016, now Pat. No. 10,246,007.

(51) Int. Cl.
| | |
|---|---|
| *F21S 41/143* | (2018.01) |
| *F21S 41/25* | (2018.01) |
| *G01C 21/36* | (2006.01) |
| *B60Q 1/26* | (2006.01) |
| *B60Q 1/00* | (2006.01) |
| *G03B 21/28* | (2006.01) |

(52) U.S. Cl.
CPC .......... *B60Q 1/2665* (2013.01); *F21S 41/143* (2018.01); *F21S 41/25* (2018.01); *F21S 43/14* (2018.01); *G01C 21/365* (2013.01); *B60Q 2400/50* (2013.01); *G03B 21/28* (2013.01)

(56) References Cited

U.S. PATENT DOCUMENTS

| | | | |
|---|---|---|---|
| 2007/0273847 A1 | 11/2007 | Minami et al. | |
| 2009/0161379 A1 | 6/2009 | Liesener | |
| 2010/0238417 A1* | 9/2010 | Streppel | G03B 21/006 353/84 |
| 2010/0321945 A1 | 12/2010 | Lang et al. | |
| 2013/0130674 A1* | 5/2013 | De Wind | B60Q 1/2619 455/420 |
| 2014/0328071 A1 | 11/2014 | Son et al. | |
| 2014/0362596 A1 | 12/2014 | Nakaya | |

FOREIGN PATENT DOCUMENTS

| | | |
|---|---|---|
| DE | 102006057671 | 6/2008 |
| DE | 102008003451 | 2/2009 |
| DE | 102012024494 | 6/2014 |
| DE | 102014203313 | 8/2015 |
| EP | 2009483 | 12/2008 |
| WO | WO2015122482 | 8/2015 |

OTHER PUBLICATIONS

German Search Report, Application No. DE 202015104894.7, dated Aug. 5, 2016.

\* cited by examiner

ILLUMINATION APPARATUS, VEHICLE COMPONENT AND VEHICLE

CROSS-REFERENCE TO RELATED APPLICATIONS

This application is a continuation-in-part of U.S. patent application Ser. No. 16/181,917, filed Nov. 6, 2018, which is a continuation-in-part of U.S. patent application Ser. No. 15/262,396, filed Sep. 12, 2016, which claims the benefit of priority to German Patent Application No. 202015104894.7, filed Sep. 15, 2015, each of which is hereby incorporated by reference in its entirety for all purposes.

BACKGROUND OF THE INVENTION

1. Field of the Invention

The following description relates to an illumination apparatus, a vehicle component and a motor vehicle. In addition, the following description relates to a lighting device for or including an external or internal cladding component of a vehicle. In addition, the following description relates to a cladding component with such a lighting device and a vehicle including at least one external or internal cladding component.

2. Related Art

Means of transportation include using a motor vehicle, a ship, an aircraft, a train or the like. While the term motor vehicle may be used throughout, the following disclosure applies equally to all means of transportation.

Especially in motor vehicles, lighting devices are increasingly becoming a formative design element that enables brand-specific individualization compared to vehicles from other manufacturers. Such individualization can be achieved, for example, with special, visually perceptible patterns or logos. The brand logos are particularly suitable as illuminated design elements. However, such patterns and logos can only be provided at great cost and effort, which is why such design elements are used relatively rarely and only in a few areas of a vehicle.

Illumination apparatuses for motor vehicles are known from the state of the art. Typically, an illumination apparatus includes a number of parts and components including, but not limited to, a condenser lens, a projector lens, a mask, among other components. Multiple illumination apparatus components are typically combined into one housing to form the device. The components may be aligned with one another so that they share a single axis, and light from a light source may follow a path along the single axis so that an image from a mask is projected.

DE 20 2008 016 695 U1, for example, describes an illumination apparatus having a so-called logo lamp in which an image or legend is projected onto a projection surface through the interaction of an illuminant, a condenser unit, a mask means and a lens unit. The illumination apparatus is arranged in a rearview device realized as an external mirror in order to project an image or a legend onto a roadway or sidewalk. The individual components of the illumination apparatus are arranged behind one another in a tubular housing. Because of the essentially vertical course of the optical path, the known illumination apparatus in the external mirror is arranged essentially perpendicular to the projection surface. The illumination apparatus can be integrated directly into an external mirror, or be attached into a corresponding receptacle on the external mirror. Indeed, the rigid arrangement of the individual components of the illumination apparatus in the tubular housing makes it difficult to integrate the illumination apparatus into or onto the external mirror because of the limited space.

DE 101 34 594 A1 describes an illumination apparatus which is adapted to project an object correlated with the driving situation into a surrounding area of a vehicle.

DE 10 2004 050 600 A1 describes an illumination apparatus for a vehicle for generating a light field in the region of the vehicle door.

US 2009/0161379 A1 describes the projection of a pattern onto a subsurface using an illumination apparatus in an external mirror.

US 2014/0362596 A1, WO 2015/122482 A1 and DE 10 2006 057 671 A1 describe other illumination apparatuses for vehicles and/or components for illumination apparatuses.

SUMMARY

In one aspect, an illumination device includes at least one illuminant for emitting light, and an optical reflection unit, including at least one reflective surface, and a surface including at least one mask, where the optical reflection unit is configured to receive the light emitted from the at least one illuminant and project at least one of an image, a symbol, a logo, a pattern, and a legend on a projection surface.

The at least one reflective surface may include at least two reflective surfaces, each of the two reflective surfaces on opposite sides of the optical reflection unit.

The at least one reflective surface may include at least three reflective surfaces, two of the three reflective surfaces being on a same side of the optical reflection unit and one of the three reflective surfaces being on an opposite side of the optical reflection unit.

The at least one reflective surface and the surface including the at least one mask may be on opposite sides of the optical reflection unit.

The at least one reflective surface and the surface including the at least one mask may be on a same side of the optical reflection unit.

The optical reflection unit may include at least four sides and the light emitted from the at least one illuminant may be configured to be projected on at least two of the at least four sides of the optical reflection unit before being projected to the projection surface.

The at least one reflective surface may include metalized or internally reflective freeform optics.

The at least one reflective surface may be at least partly planar or curved.

The surface including the at least one mask may include at least one of an image ablated metalized reflective surface and a micro-optic.

The at least one surface may include the at least one mask and be formed together with one of the at least one reflective surface.

The optical reflection unit may include at least two curved edges and at least on planar edge.

The optical reflective unit may have a freeform geometry.

The light emitted from the at least one illuminant may be configured to enter the optical reflection unit from a first side of the optical reflection unit, the light projected to the projection surface may be configured to exist the optical reflection unit from a second side of the optical reflection unit, the at least one reflective surface may include at least two reflective surfaces with one of the two reflective surfaces being formed on the first side and the other being formed on the second side, and the surface including the at least one mask may be formed on the first side.

The at least one surface including the at least one mask may be formed together with the reflective surface on the first side.

The light emitted from the at least one illuminant may be configured to contact an inner surface of the optical reflection unit at least four times before being projected to the projection surface.

The at least one reflective surface may be configured to deflect the optical path in at least one of a range of 35° to 145°, 45° to 135°, 60° to 120°, and about 90°.

The at least one mask may be at least one of mechanically and electrically alterable or adjustable in order to change at least one of an image, a symbol, a logo and a legend that the mask is configured to display on the projection surface.

The at least one reflective surface may include a lens arranged on the at least one reflective surface and configured as a separate or separable component in order to focus the light.

The at least one reflective surface may include at least one of a condenser unit and a lens unit.

The illuminant may emit the light essentially perpendicular to the projection surface.

At least one of the at least one reflective surface or the at least one surface including the at least one mask may be incorporated into the optical reflection unit or separate components arranged close to or attached to the optical reflection unit.

In another aspect, a vehicle unit of a motor vehicle may include at least one illumination device.

The at least one illumination device may provide a logo lamp, which is adapted to be at least one of moveable relative to the vehicle or attachable to the exterior of the vehicle The vehicle unit may include at least one of an internal or external mirror or camera.

In yet another aspect, a motor vehicle may include at least one vehicle unit.

In a further aspect, a lighting device for or including an external or internal cladding component of a vehicle includes a flat element which is configured to be integrated into the cladding component or form the cladding component, which flat element forms at least a portion of a visible side of the cladding component and which is at least partially translucent, a carrier structure with at least one light-reflecting surface arranged on a rear side opposite the visible side of the flat element, at least one light source for providing light in the lighting device, wherein the light-reflecting surface and the light source are formed and arranged such that the light is reflected from the light-reflecting surface to the surface element and is visually perceptible on the visible side, and at least one optical reflection unit which reflects a light-absorbing or light-scattering light, in particular with respect to brightness and/or color, towards the surface element in such a way that a pattern is visually perceptible on the visible side, whereat the light-reflecting surface is arranged on or extends onto the optical reflection unit.

The light-reflecting surface may serve to reflect the light towards the surface element. At least part of the light may fall directly on the surface element. The part of the light that does not fall directly on the surface element would be at least largely lost without the light-reflecting surface. For manufacturing reasons, the optical reflection unit may be arranged on the light-reflecting surface, but this is not necessarily the case. In the simplest case, the patterns on the visible side can be created by differences in brightness. As mentioned above, the light-reflecting layer ensures that as much light as possible is directed to the visible side, while the optical reflection unit is designed in such a way that, in the simplest case, less light is directed to the visible side.

The light-reflecting surface can be distinguished by the fact that it has a very smooth surface, so that a particularly bright section is produced on the visible side, which stands out from the other sections. The fact that the light-reflecting surface is arranged on or extends over the pattern-generating section makes the lighting device very compact.

With the suggested lighting device, even complex patterns or logos can be integrated into cladding components in a comparatively simple way. It is possible to provide the flat element with curvatures so that the proposed lighting device can be used in any area within the means of passenger and/or goods transport, which was previously impossible or only possible with unjustifiably great expense.

The optical reflection unit may include a light-absorbing or light-scattering coating. The light absorbing coating can be provided in a very simple way with a black or at least dark lacquer finish. It is also possible to apply a light diffusing coating to the optical reflection unit, which is characterized by a particularly rough surface. In both cases, a dark section is created on the visible side that stands out from the rest of the pattern.

The pattern-generating section may include a color-changing coating to change the color of the reflected light. The ribbon coating is designed to absorb certain wavelength ranges of visible light more strongly than other wavelength ranges. In this respect, with more or less constant brightness, a section can be created on the visible side that stands out from the other sections in terms of color.

In another example, the pattern-generating section can be placed on a support element which is connected to the support structure. The various coatings can be applied directly to the support element before the support element is connected to the support structure of the lighting device. The support element can consist of a material which is particularly suitable for the application of the various coatings. It is therefore not necessary to apply the various coatings to the entire light-reflecting surface. Rather, it is sufficient to coat only the support element accordingly. In addition, the carrier element can enclose a certain angle with the rest of the light-reflecting surface, so that this alone produces differently bright areas on the visible side.

An advanced version is characterized by the fact that at least one light source is attached to the supporting structure. In general, the light source can be arranged as desired. Light guides, for example, can be used to direct the light to the lighting device.

It is therefore possible to arrange the light source outside the lighting device. The arrangement of the light source on the support structure has the advantage that the light source and the support element can be aligned in a targeted manner to create special patterns or logos on the visible side. The variety of the achievable light effects can be increased by this.

In another example, the light source may include at least one RGB LED. RGB LEDs are in many cases designed to include three light-emitting diodes, one of which emits red light, one green light and one blue light. Depending on which of the LEDs emits light, the generated light appears in a certain color. As a result, a large number of colors can be easily generated with the RGB LED and the colors of the pattern, which is visually perceptible on the visible side, can be changed.

In an aspect, an external or internal cladding component for a vehicle includes at least one lighting device. A design may include a vehicle including at least one external and/or internal cladding component.

According to various aspects, such lighting devices can be easily arranged in any area of the vehicle. The lighting devices can also be integrated into cladding components with a curved surface.

DESCRIPTION OF THE SEVERAL VIEWS OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

Figure 1:
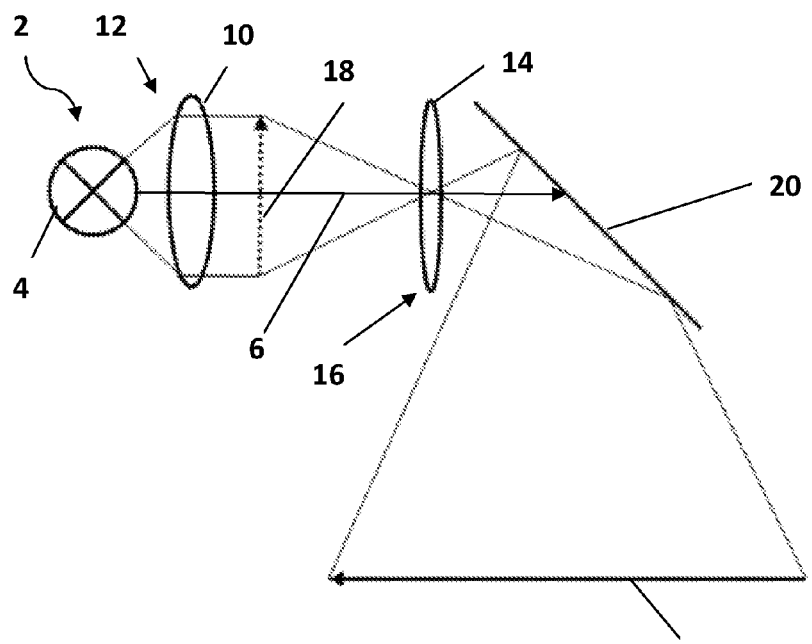
FIG. 1 is a diagram illustrating a first example of an illumination apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Before explaining at least one example of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

The figures each depict an illumination apparatus 2 for a vehicle component of a motor vehicle as in the form of an external mirror or camera, for example. The depicted illumination apparatuses 2 each include an illuminant 4 by means of which light can be emitted, essentially parallel to a plane of a projection surface 8 for example.

In addition, each illumination apparatus 2 includes at least one condenser lens 10 of a condenser unit 12. The condenser lens 10 couples the light emitted by the illuminant 4 into an optical path 6, which can also run essentially parallel to the plane of the projection surface 8, depending on the embodiment example.

As depicted in the figures, the illumination apparatus 2 also includes at least one objective lens 14 of a lens unit 16.

In order to display a logo 8, for example, onto the projection surface, the illumination apparatus 2 furthermore includes a mask means 18.

The illumination apparatuses 2 illustrated in the figures furthermore each include a reflector unit 20, which makes it possible for the optical path 6 to be deflected essentially transversely or diagonally to the projection surface 8.

FIG. 1 depicts a first example of the illumination apparatus 2. In this example, the condenser unit 12, which also includes the condenser lens 10, is provided directly following the illuminant 2. Subsequently, the light passes through the mask means 18 before it impinges on the objective lens 14, which is included in the lens unit 16. In the further course of the optical path 6, the light then impinges on the reflector unit 20, which deflects it by essentially 90° degrees onto the projection surface 8.

Figure 2:
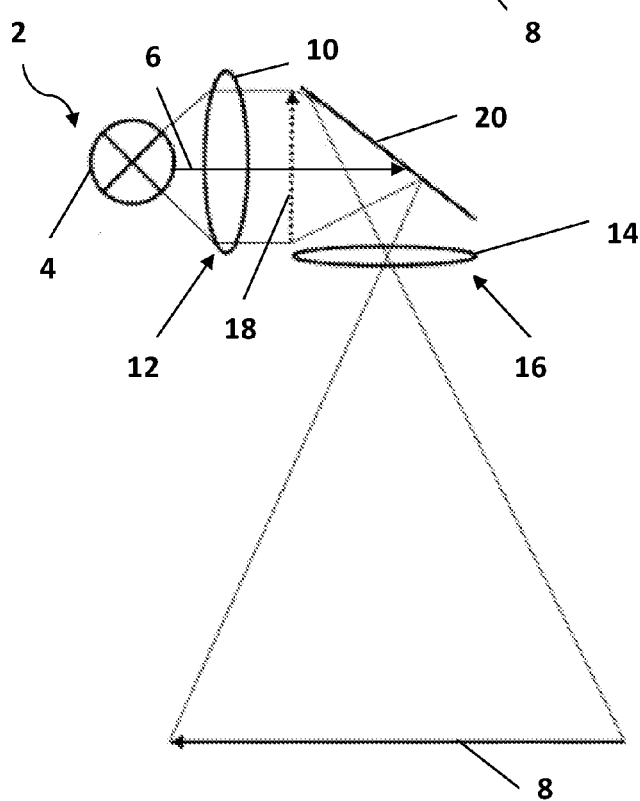
FIG. 2 is a diagram illustrating a second example of an illumination apparatus.

FIG. 2 depicts a second example of the illumination apparatus 2. In this example, as also shown in FIG. 1, first the illuminant 4, the condenser unit 12 and the mask means 18 are arranged one behind the other so that the light also passes through these components successively. Then the light does not pass through the lens unit 16 however, but is first deflected on the reflector unit 20. After being deflected by the reflector unit 20, the light passes through the lens unit 16 to then arrive at the projection surface 8. This construction allows a reduction in the space needed for installation.

Figure 3:
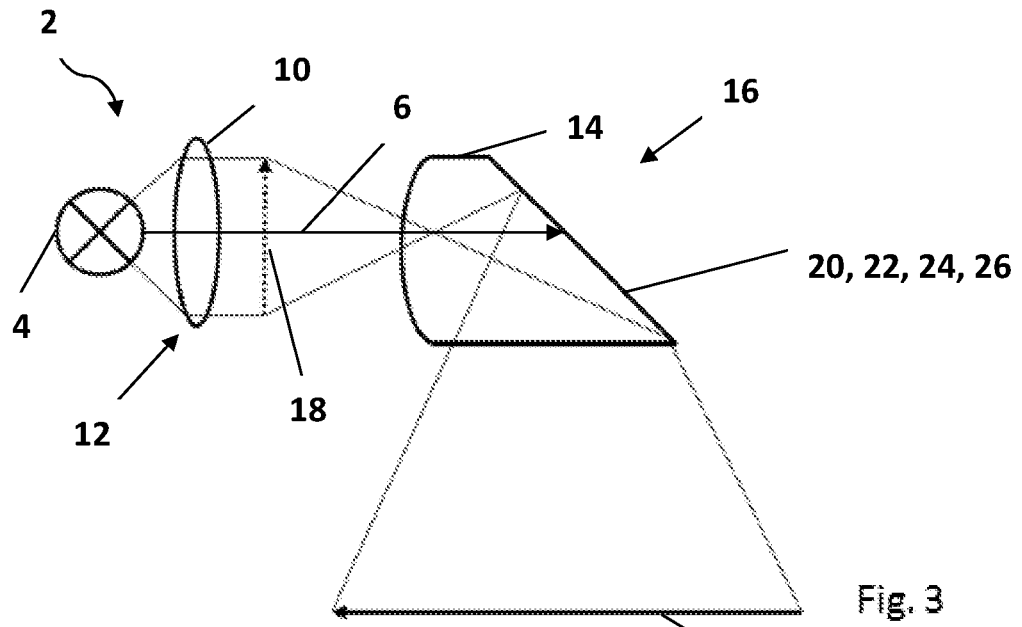
FIG. 3 is a diagram illustrating a third example of an illumination apparatus.

FIG. 3 depicts a third example of the illumination apparatus 2. In this example, the illumination apparatus is implemented with reduced components. The light emitted by the illuminant 4 first passes through the condenser unit 12 and the mask means 18, then, as already shown in FIG. 2, it directly impinges on the reflector unit 20. In the example depicted in FIG. 3, a reflector element 22, which includes a light guide 24 and/or a prism 26, forms the reflector unit 20. The reflector element 22 thereby assumes the function of the lens unit 16. The example of the illumination apparatus 2 depicted in FIG. 3 can thus be produced with reduced components and implemented compactly.

Figure 4:
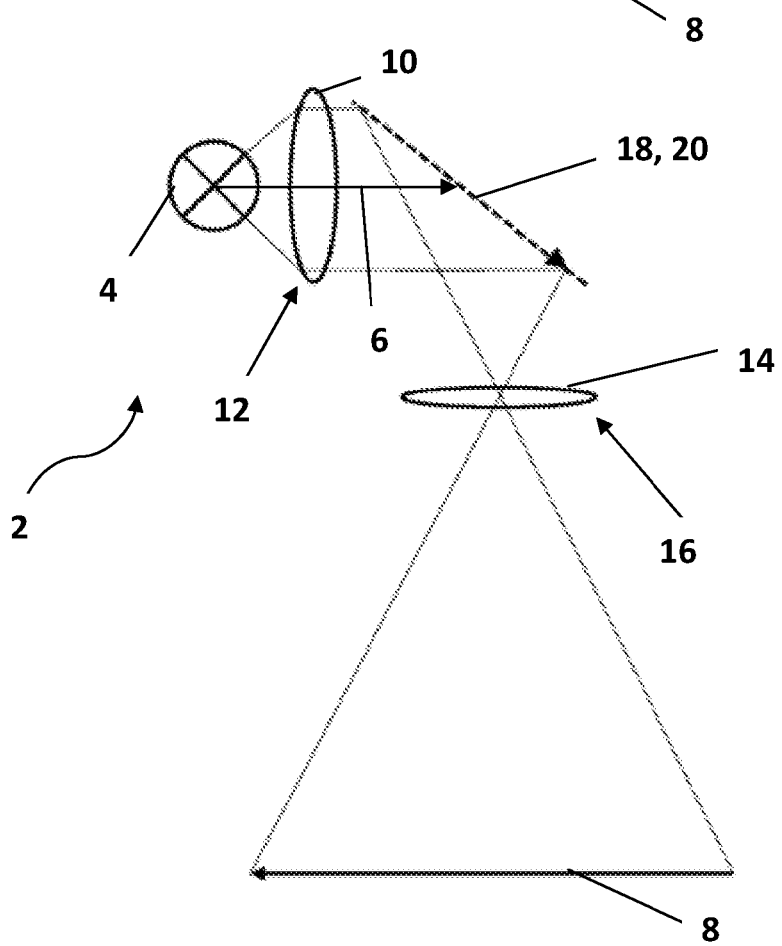
FIG. 4 is a diagram illustrating a fourth example of an illumination apparatus.

FIG. 4 depicts a fourth example of the illumination apparatus 2. The depicted illumination apparatus 2 is similar to the illumination apparatus 2 depicted in FIG. 2, except that the embodiment depicted in FIG. 4 combines the mask means 18 and the reflector unit 20 in a common component. The installation dimensions of the illumination apparatus 2 can thereby also be reduced.

Figure 5:
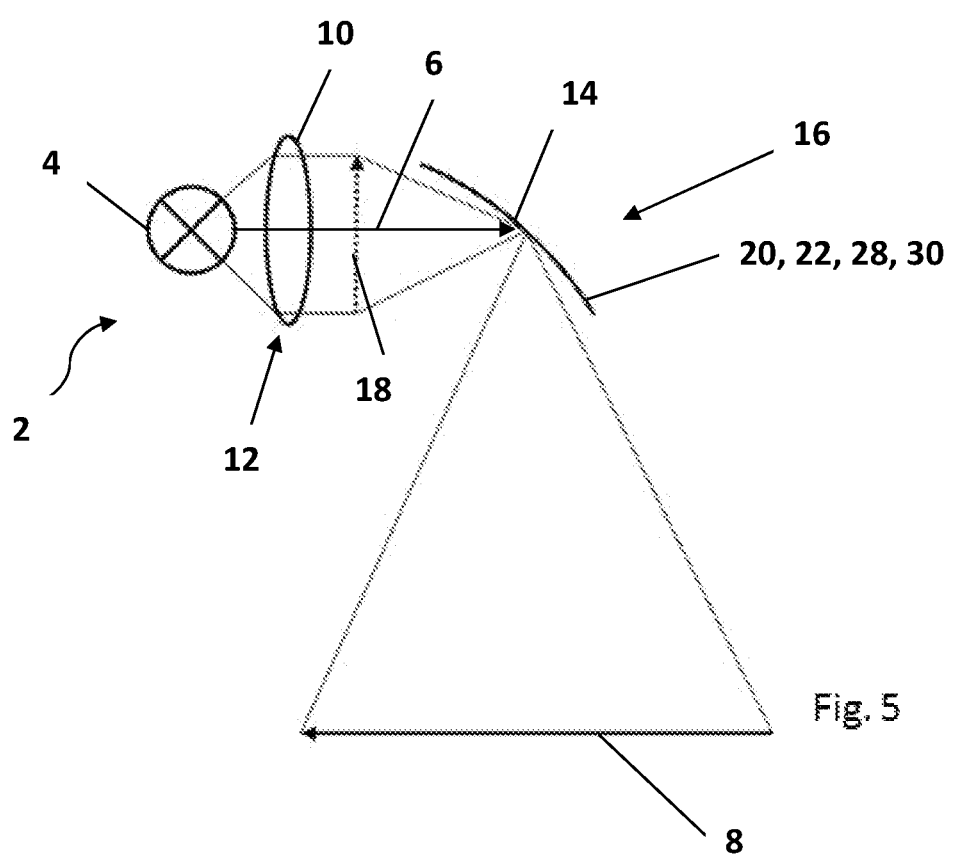
FIG. 5 is a diagram illustrating a fifth example of an illumination apparatus.

FIG. 5 depicts a fifth example of the illumination apparatus 2. In the depicted example, the lens unit 16 and the reflector unit 20 are included within a common component. In contrast to the example depicted in FIG. 3, the reflector unit 20 does not include a light guide and/or prism as reflector element 22, but is realized by a freeform surface 28, which is configured on a surface section 30 of the reflector element 22.

Figure 6:
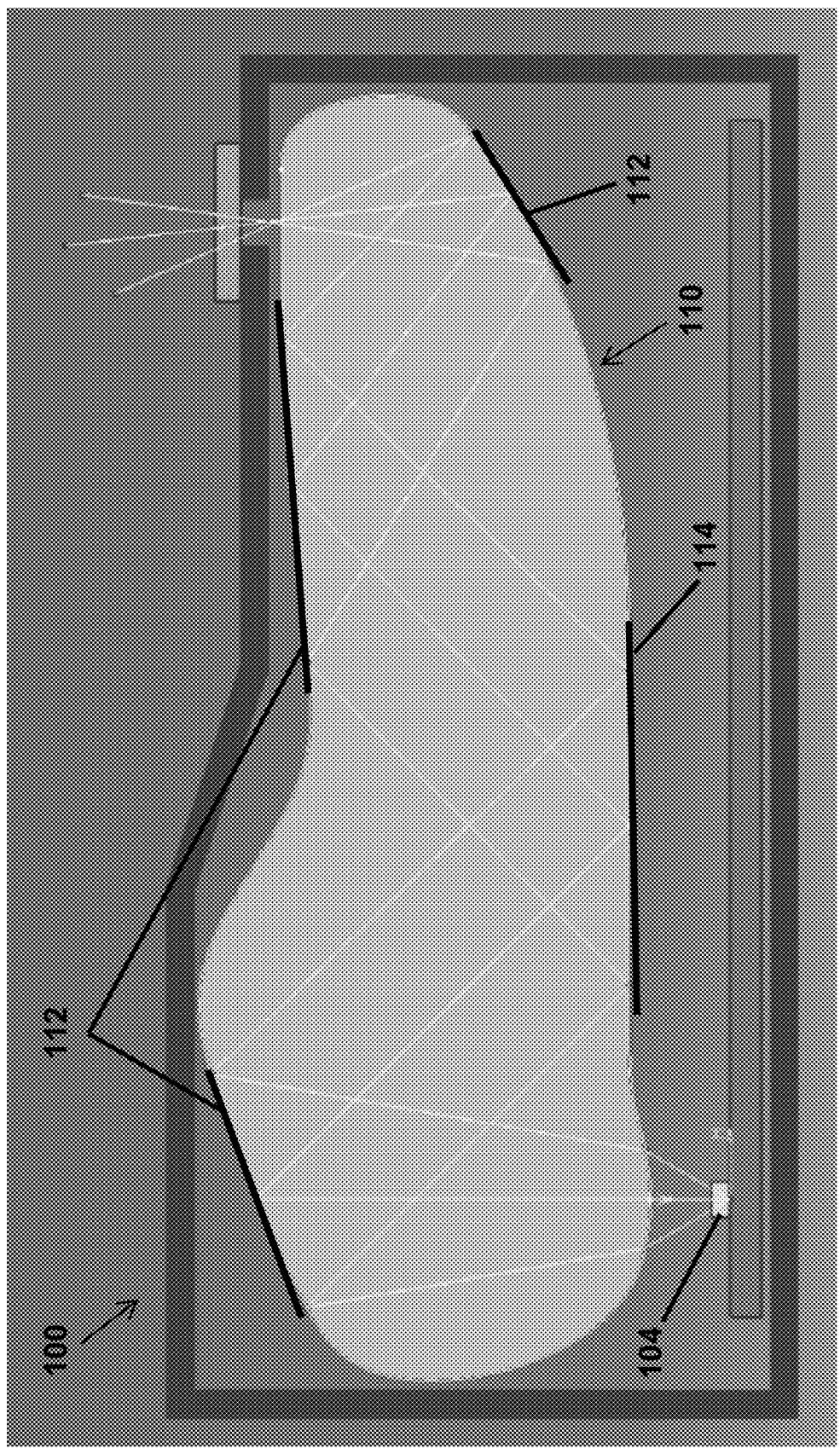
FIG. 6 is a diagram illustrating a sixth example of an illumination apparatus.

FIG. 6 depicts another example of an illumination apparatus 100. The illumination apparatus 100 includes a light source or illuminant 104. Unlike the illumination apparatus 2 of other examples, the illumination apparatus 100 of this example includes a single optical component 110 instead of multiple components. The single reflective optical component 110 of this example includes a plurality of mirrors and reflective surfaces 112. In a preferred example, the single reflective optical component 110 is freeform in shape with the optical axis being segmented between the plurality of mirrors 112. The plurality of mirrors 112 may include metalized or internally reflective freeform optics and/or surfaces. As a result, the single optical component 110 may replace the lenses in a logo projector system such as the condenser lens 10, the objective lens 14, and the reflector unit 20 described in other examples, i.e. as illustrated in FIGS. 1-5, with a single component. This results in significant assembly advantages over the state of the art as well as cost advantages due to lower piece count.

Still referring to FIG. 6, the single optical component 110 of the illumination apparatus 100 preferably also contains a planar surface with a selectively reflective mask means or mask surface 114 either incorporated into the single optical component 110 or as a separate component arranged close to or attached to the single optical component 110. The mask means or mask surface 114 may be a surface which is an image ablated metalized reflective surface, or may be a micro-optic as used in Digital Light Processing (DLP) applications. In other examples, the mask means or mask surface 114 may be selectively transmissive rather than being reflective, and may be freeform rather than being planar. The mask means or mask surface 114 produces a mask that is then projected by the lamp onto the ground or to the selected projecting surface. As may be appreciated, the mask means or mask surface 114 replaces the mask means 18 described in other example thereby further reducing the number of components.

In a preferred example, the surfaces of the reflective surfaces 112 are all internally reflective. In other words, the incident light is below the critical angle of the material which makes a high index material preferable. This is because an internally reflective surface has very high efficiency, i.e. greater than 99%, whereas a coated surface like a mirror is significantly less efficient. In addition, the reflective surfaces 112 preferably do not overlap one another. As a result, the angle of reflection may range from greater than 10 degrees (change in optical path) to less than 170 degrees. In another example, the optical component 110 may be changed to have a more prismatic arrangement where all reflections are over 90 degrees and the shape of the optical component 110 is similar to a staircase.

In the examples described above, the one or more reflective surfaces 112 which are configured to receive incident light from the light source or illuminant 104 prior to the mask means or mask surface 114 are for configured to capture the light from the light source or illuminant 104 and focus it onto the mask means or mask surface 114. The one or more reflective surfaces 112 which are configured to receive incident light after the light is received by the mask means or mask surface 114 are configured to project (focus) the mask onto the projection plane. In the preferred example, as many of the reflective surfaces 112 as possible are formed from a material which exhibits total internal reflection rather than refraction, and instead of being plated/painted to form a reflective surface, as described above.

In an aspect, an illumination apparatus for a vehicle component, especially for a rearview device of a motor vehicle, may include at least one illuminant, wherein the illuminant is adapted to emit light. The illumination apparatus furthermore features a condenser unit including at least one condenser lens, wherein the condenser unit is adapted to focus the light emitted by the at least one illuminant into an optical path. The term "optical path" in this connection refers to the geometrical course of light beams and can also be called beam direction. The term "focus" refers to coupling light into an optical path, wherein as large a portion of the emitted light of the illuminant as possible is to be brought into the image-forming optical path. Moreover, the illumination apparatus features at least one mask means, which is arranged in the optical path and by means of which an image, symbol, logo and/or legend can be displayed on a projection surface. Moreover, the illumination apparatus features a lens unit having at least one objective lens, which is arranged in the optical path. According to the invention, the illumination apparatus also features at least one reflector unit which is arranged between the condenser unit and the projection surface, wherein the reflector unit is adapted to deflect the optical path, especially essentially transversely or diagonally, to the projection surface, wherein the reflector unit includes a reflector element which includes at least one surface section by means of which the light can be deflected relative to the optical path, and wherein the surface section of the reflector element is configured as a freeform surface in order to focus the light. In this connection, the expression "deflect transversely or diagonally to the projection surface" relates to a deflection or diversion of the optical path at an angle to the vertical to the projection surface. "Deflection of the optical path" can also be understood as a deflection of an optical axis. In this connection, the term "optical axis" describes the averaged propagation direction of all beams in the image-forming optical path between successive units The use of the reflector unit allows the illumination apparatus to be arranged in or on the vehicle component in a place-saving manner. The illumination apparatus according to the invention does not need to be arranged exclusively vertical to a projection surface, but can also be arranged diagonally to the projection surface for example or parallel to the projection surface. This facilitates the integration of the illumination apparatus to the extent that a particular place does not absolutely have to be provided for the illumination apparatus, but the illumination apparatus can rather be provided in the vehicle component at a location and with an orientation that just happens to offer adequate space for its installation.

In one example, the reflector unit is adapted to deflect the optical path in a range of 35° to 145°, preferably of 45 to 135°, more preferably of 60° to 120°, especially by 90°.

In another example of the invention, the at least one reflector unit is arranged along the optical path of the light, proceeding from the illuminant up to the projection surface, in front of or behind the lens unit. In addition, the at least one reflector unit can however also be arranged any place inside the illumination apparatus. It is basically conceivable that the illumination apparatus includes a plurality of reflector units. This proves advantageous particularly when the installation space available inside the vehicle component is not straight, but angular.

It is furthermore conceivable that the illuminant is surrounded by another reflector means in such a manner that light which is not coupled into the optical path is collected by the reflector means and coupled into the optical path. This allows the intensity of the light in the optical path and the utilization of the light emitted by the illuminant to be improved.

In still another example, the mask means is arranged along the optical path of the light, proceeding from the illuminant up to the projection surface, between the condenser unit and the lens unit.

In one example, the reflector unit includes the mask means. The illumination apparatus can be realized compactly and with reduced components if the reflector unit includes the mask means. In this case, the mask means and reflector unit can be included within a common component for example, or be joined in such a manner that they are undetachably or detachably connected together and can be added in as a pre-assembled subassembly of the reflector unit.

In another example, the mask means is mechanically and/or electrically alterable or adjustable in order to change the image, symbol, logo and/or the legend that the mask means can display on the projection surface. It is also basically conceivable to prescribe that the mask means cannot change the image, symbol, logo and/or the legend that the mask means can display on the projection surface. In addition, the mask means can display a plurality of images or a continuous legend, for example.

The reflector unit can basically be configured as desired. In one example, the reflector unit includes a lens means arranged on the reflector element and configured as a separate or separable component in order to focus the light. In this example, the lens means can include the condenser unit and/or the lens unit.

If the surface section of the reflector element is configured as a freeform surface, then the reflector unit can be implemented compactly.

If a plurality of reflector units is provided, then it is conceivable for example that a first reflector unit includes the condenser unit and a second reflector unit includes the lens unit. This allows the number of individual components in the illumination apparatus to be further reduced.

In another example, the reflector unit includes both the mask means and also the condenser unit and/or the lens unit. This advantageously allows the number of components of the illumination apparatus to be further reduced. The configuration of the reflector unit both as mask means and also as condenser unit and/or as lens unit is then especially advantageous when little space is available in the vehicle component to arrange the illumination apparatus therein or thereon.

In one example, the reflector unit includes both the mask means and also the condenser unit and/or the lens unit. In still another example, the reflector element includes a light guide and/or a prism.

In a further example, the at least one condenser lens of the condenser unit and/or the at least one objective lens of the lens unit includes at least one toric lens element. This thereby advantageously allows rectangular displays with high irradiance, even in corners, to be realized in a simple manner.

If the illumination apparatus according to the invention is arranged parallel to a plane of a projection surface, then the illuminant can also emit the light essentially parallel to the projection surface. A diagonal emission relative to the projection surface is also conceivable.

The at least one condenser lens of the condenser unit and/or the at least one objective lens of the lens unit can be developed fundamentally or as desired.

In addition, the invention provides a vehicle component of a motor vehicle having at least one illumination apparatus according to the invention. The vehicle component can be any component on the vehicle that is arranged so that it can enable access to the external surroundings of the motor vehicle. To this end, it can for example concern a body panel for example, a bumper device, elements of the vehicle doors and the like. Preferably this vehicle component can include a rearview device, like interior or exterior mirror or camera.

In one example, the optical path of the light directly emitted by the illuminant runs essentially parallel to a driving surface. Since the optical path runs essentially parallel to the driving surface, the illumination apparatus is essentially arranged horizontally. In addition, it is nevertheless conceivable that the illumination apparatus is arranged running diagonally or vertically to the driving surface.

In another example, at least one hollow space, which forms a housing for the illumination apparatus and within which the illumination apparatus can be fixed, is configured in the vehicle component. It is basically conceivable that the illumination apparatus is fixed on the vehicle component for example. To nevertheless be able to protect the illumination apparatus from damage and soiling, it proves advantageous if the illumination device can be fixed within the vehicle component. In addition to protection from soiling and damage, an arrangement of the illumination apparatus that is optically appropriate is thereby furthermore selected.

Still referring to the examples of the illumination apparatuses 2, 100 illustrated in FIGS. 1-6, the illumination apparatuses 2, 100 may be included in a rearview device such as a rearview mirror, a camera, a sensor, or a camera monitoring system. However, the illumination apparatuses 2, 100 are not limited to rearview devices and may be included in other vehicle body parts. For example, the illumination apparatuses 2, 100 may be included in an external cladding component such as a vehicle bumper or a tailgate of the vehicle, or an internal cladding component such as a door cladding, among other examples. In these examples, the image, symbol, logo, pattern, or legend (hereinafter, "the projected light") may be projected on a ground or floor surface adjacent to a vehicle such as with a flood light of a rearview device. However, the projection is not limited thereto. That is, in other examples the projected light may be projected on another surface such as directly on a user, on a surface outside the vehicle, or an a surface inside the vehicle.

Further, in additional examples, the projected light may be projected on a screen surface which may be part of the illumination apparatuses 2, 100. Other examples of illumination apparatuses with a screen surface which is part of the illumination apparatus will now be described with reference to FIGS. 7-10.

Figure 7:
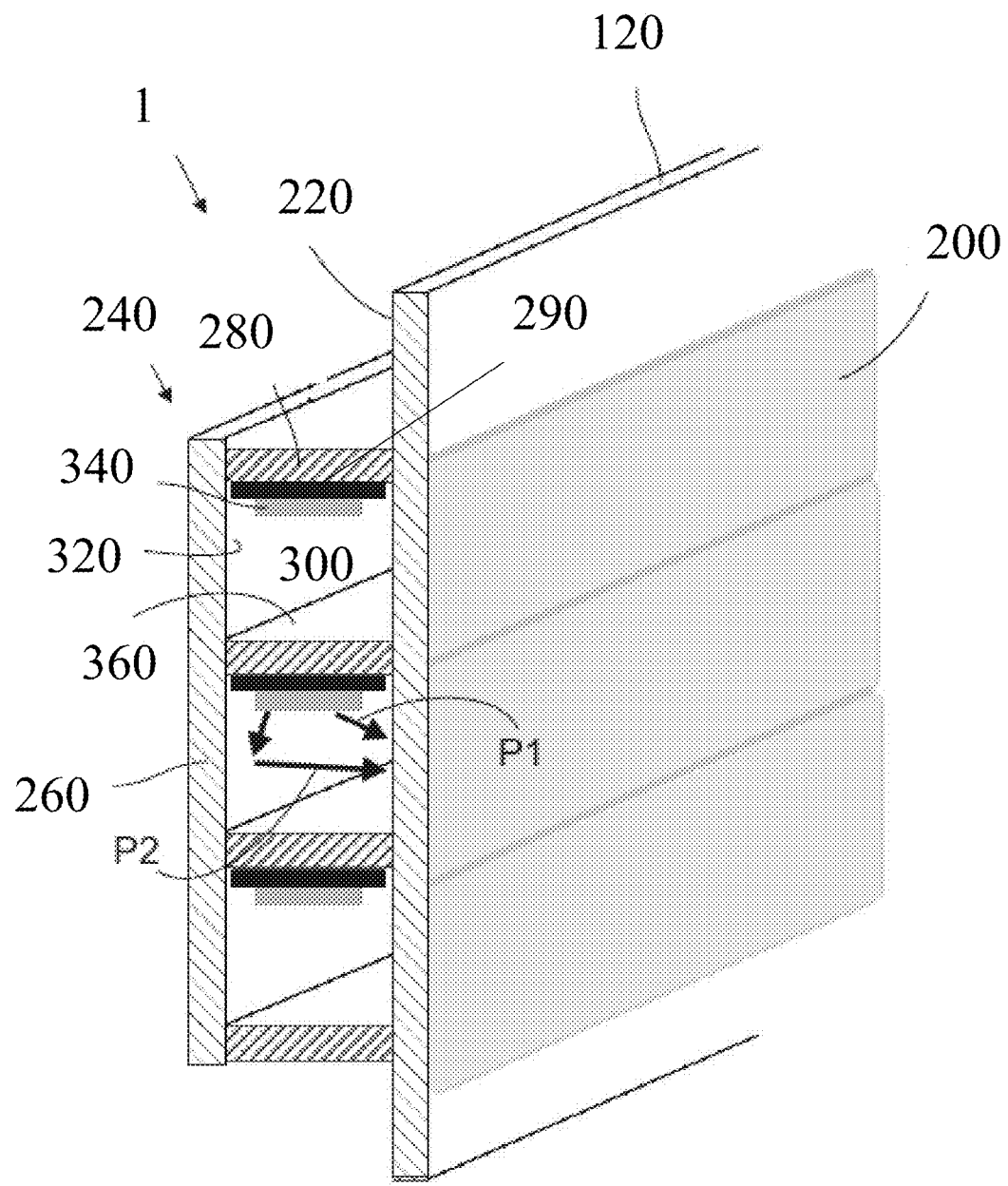
FIG. 7 is a diagram illustrating a prior art illumination apparatus with an integrated screen surface.

FIG. 7 shows an example of a prior art illumination apparatus 1 using a principal and perspective representation. The illumination apparatus 1 includes a screen surface 120 which can be integrated into an external or internal cladding component 140 of a vehicle 160, in particular a motor vehicle 180 (not shown in FIG. 7, see FIG. 10). However, it is also possible to use the illumination apparatus 1 itself as a cladding component 140 without having to integrate the illumination apparatus 1 into another cladding component 140.

The screen surface 120 forms a visible side 200, which is visually perceptible to one observer. In the event that the illumination apparatus 1 is used for or forms an internal cladding component 140, the observer is usually a passenger or a vehicle occupant located in the interior of the vehicle 160. In the event that the illumination apparatus 1 is used for or forms an external cladding component 140, the visible side 200 is visually perceptible to any person located in the immediate vicinity of the vehicle 160.

The side opposite the visible side 200 is to be referred to as the rear side or projection surface 220 of screen surface 120. The rear side or projection surface 220 of screen surface 120 is where light from the illumination apparatus 1 is ultimately projected. On the projection surface 220, a carrier surface 240 is arranged which in the example shown has a rear wall 260 and a total of four partition walls 280 arranged between the rear wall 260 and the screen surface 120. The number of partition walls 280 can be freely selected to a large extent. In one example, at least two partition walls 280 are used. While the rear wall 260 runs parallel to the surface element 120, the partition walls 280 run perpendicular to it. Due to this arrangement, a total of three cavities 300 are created in the example shown.

The surface of the rear wall 260 pointing towards the screen surface 120 is designed as a light-reflecting or reflective surface 320. The reflective surface 320 can be shaped like a mirror. Alternatively, it can be provided with a light, transparent, or white colored coating which is preferably smooth.

In each of the three cavities 300 an illuminant 340 is arranged to provide light in the respective cavities 300. In the case of the lighting device 1 shown, the illuminant 340 is fixed to the partition walls 280, in this case in the form of a ceiling lighting. When the illumination apparatus 1 is used as intended, the illuminant 340 is thus located at the upper end of the cavities 300 whereby it is also possible to arrange the illuminant 340 at the lower end of the cavities 300 so that the illuminant 340 is arranged in the cavity 300 in the manner of a floor lighting. In addition, it is also possible to mount an illuminant 340 on both partition walls 280 so that there are two illuminants 340 per cavity 300.

While an illuminant 340 is discussed throughout, it is not to be understood as meaning that there is only one illuminant 340. Rather, any number of illuminants 340, such as a number of light-emitting diodes, can also be provided. The one or more illuminants 340 can be assigned to one or more groups of illuminants 340.

The light emitted by the illuminant 340 may fall directly onto the projection surface 220 of the screen surface 120 (light path marked with arrow P1) and onto the reflective surface 320 (light path marked with arrow P2). In addition, a part of the light hits the surface 360 of the further partition 280 of the cavity 300 opposite to the illuminant 340. In the example shown, however, this side is not reflective, so that this part of the light is not observed closely and can be neglected. However, it should be mentioned here that this surface 360 can also be made reflective so that the part of the light incident on this surface is also reflected to a considerable extent towards the screen surface 120.

As can be seen from FIG. 7, the screen surface 120 is at least partially translucent, so that at least part of the light incident on the projection surface 220 can pass through the screen surface 120 and exit from the screen surface 120 on the visible side 200. As shown in FIG. 7, the visible side 200 is illuminated substantially homogeneously. It is also good to see that darker sections on the visible side 200 are produced where the partition walls 280 and the projection surface 220 of the screen surface 120 are adjacent to each other.

As mentioned above, with the illumination apparatus 1 shown in FIG. 7, the visible side 200 is illuminated more or less homogeneously so that it is not possible to create special lighting effects on the visible side 200. In particular, it is not possible to visually display images, such as patterns or logos, on the screen.

Figure 8A:
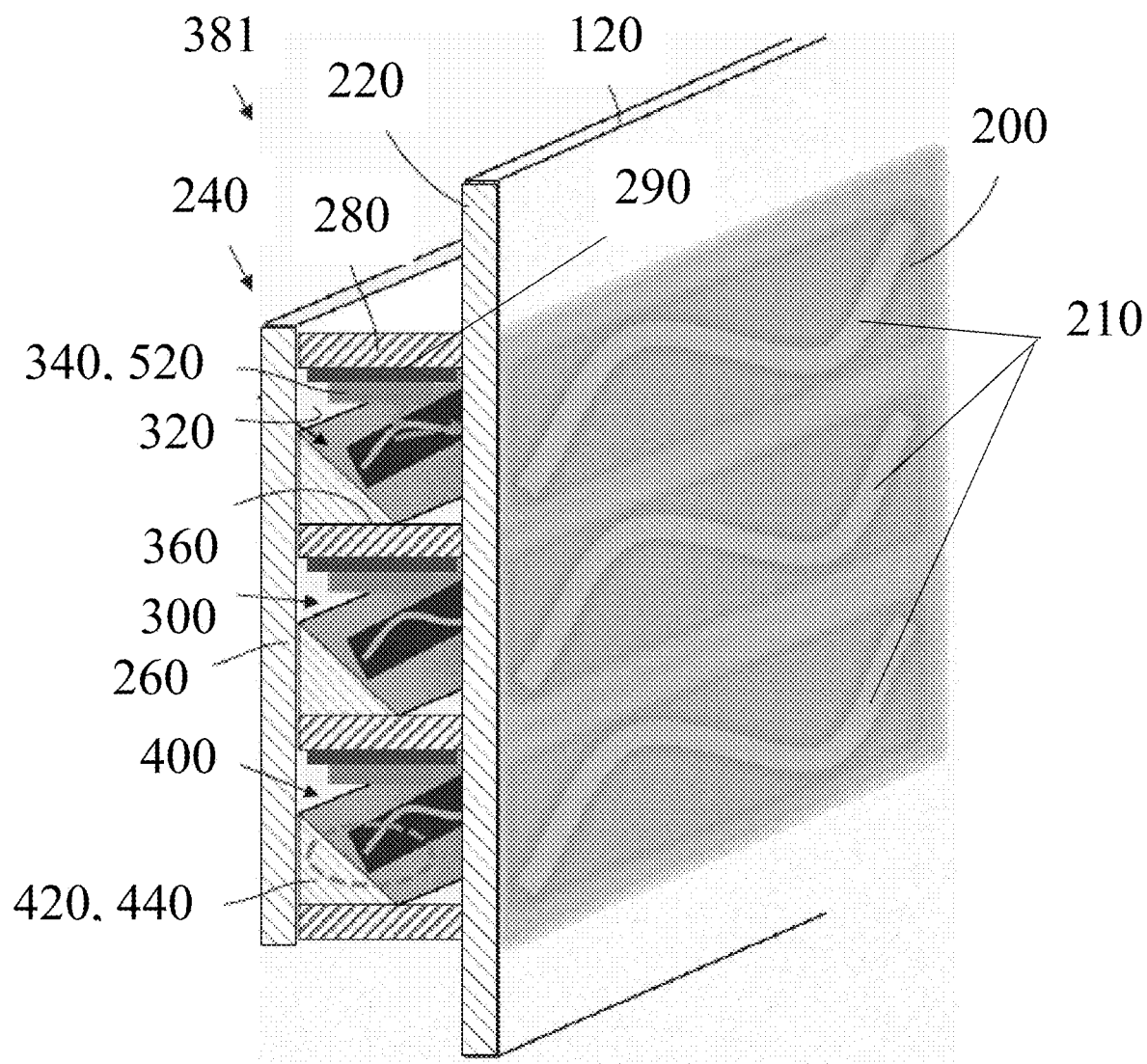
FIG. 8A is a diagram illustrating a first example of an illumination apparatus with an integrated screen surface.
Figure 8B:
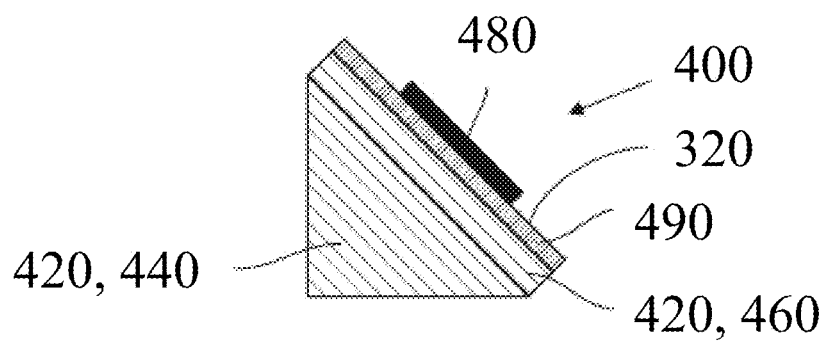
FIG. 8B is a diagram illustrating a separate section, not enlarged to scale, of part of the illumination apparatus shown in FIG. 8A.

FIGS. 8A and 8B show a first example of an illumination apparatus 381 with an integrated screen surface. FIG. 8A shows the illumination apparatus 381 analogous to the representation chosen in FIG. 7. FIG. 8B shows a section of the illumination apparatus 381 shown in FIG. 8A, not enlarged to scale. The structure of the illumination apparatus 381 largely corresponds to the lighting device 1 shown in FIG. 7 which is why only the main differences are discussed below.

The illumination apparatus 381 includes an optical reflection unit 400 which is arranged on a carrier element 420 in the illustrated example of the inventive lighting device 381. The carrier element 420 includes a first section 440 with a triangular cross-section and a second section 460 with a roughly rectangular cross-section. It should be noted here that the second section 460 in FIG. 8B is shown much larger than is usually the case in reality for reasons of representation. The second section 460 may also be omitted in some examples.

The optical reflection unit 400 includes a light-absorbing coating 480 which, in the example shown, is applied to the reflective surface 320 which may be similar in construction to the reflective surface 320 already described for the example shown in FIG. 7 but which extends to the optical reflection unit 400 in accordance with the example of the illumination device 381. The reflective surface 320 in the example shown is arranged on an intermediate layer 490 applied to the second section 460 of the carrier element 420. The intermediate layer 490 can be selected so that the reflective surface 320 can be easily produced and the light-absorbing coating 480 can be easily applied.

In one example, the reflective surface 320 may also extend to the surface of the rear wall 260 pointing to the screen surface 120 but this disclosure is not limited to this example.

As can be seen from FIG. 8B, the light absorbing coating 480 may include a black varnish. Also, the optical reflection unit 400 can also have a light-scattering coating instead of or in addition to the light-absorbing coating 480 which is characterized by a very rough surface. Depending on whether the light hits the reflective surface 320, the light-absorbing coating 480 or a light-scattering coating, the light is affected in different ways.

While the light incident on the reflective surface 320 is reflected to a very large extent and directed, the light incident on the light-absorbing coating 480 is largely absorbed there, so that it is virtually not reflected at all. In the event that the optical reflection unit 400 has a light-scattering coating, the incident light is reflected in different directions.

In embodiments, the light-absorbing coating 480 and/or the light-scattering coating may also be referred to as a mask. In embodiments, the light absorbing coating and/or the light-scattering coating may be configured to absorb or scatter light within a certain frequency spectrum. In different embodiments the light-absorbing coating 480 and/or light-scattering coating may be arranged to provide either a negative or a positive mask. For example, if arranged as a positive mask, the masked area may be arranged in the shape of the image to be displayed on the projection surface 120, and if arranged as a negative mask, the masked area may be arranged such that the reflective surface 320 provides the shape of the image to be displayed.

As mentioned, the carrier element 420 includes the first section 440, which is approximately triangular in cross-section and with which the optical reflection unit 400 is fixed to the carrier structure 240. In the illumination device 381, the first section 440 of the support element 420 is fixed to the rear wall 260 on the one hand and to one of the partition walls 280 on the other hand. The carrier element 420 is arranged in such a way that it rests on the surface 360 of the partition wall 280 which is arranged opposite the illuminant 340. The optical reflection unit 400 includes approximately a 45° angle with the partition wall 280 and the rear wall 260.

Due to the fact that the light incident on the optical reflection unit 400 is reflected in different ways, a larger or smaller amount of light is reflected towards the screen surface 120, such that the light intensity is affected so that sections of different brightness are produced on the visible side 200. As a result, an image (e.g, a pattern, symbol, logo, legend, or other image) appears on the visible page 200 which resembles a sinusoidal curve in the example shown. In certain embodiments, the mask (e.g., light-absorbing and/or light-scattering coating) may be mechanically and/or electrically alterable in order to change the image projected on the screen surface 120. In other embodiments, the optical reflection unit 400 and or the mask may be detachably mounted, for example in order the change the projected image.

Figure 9A:
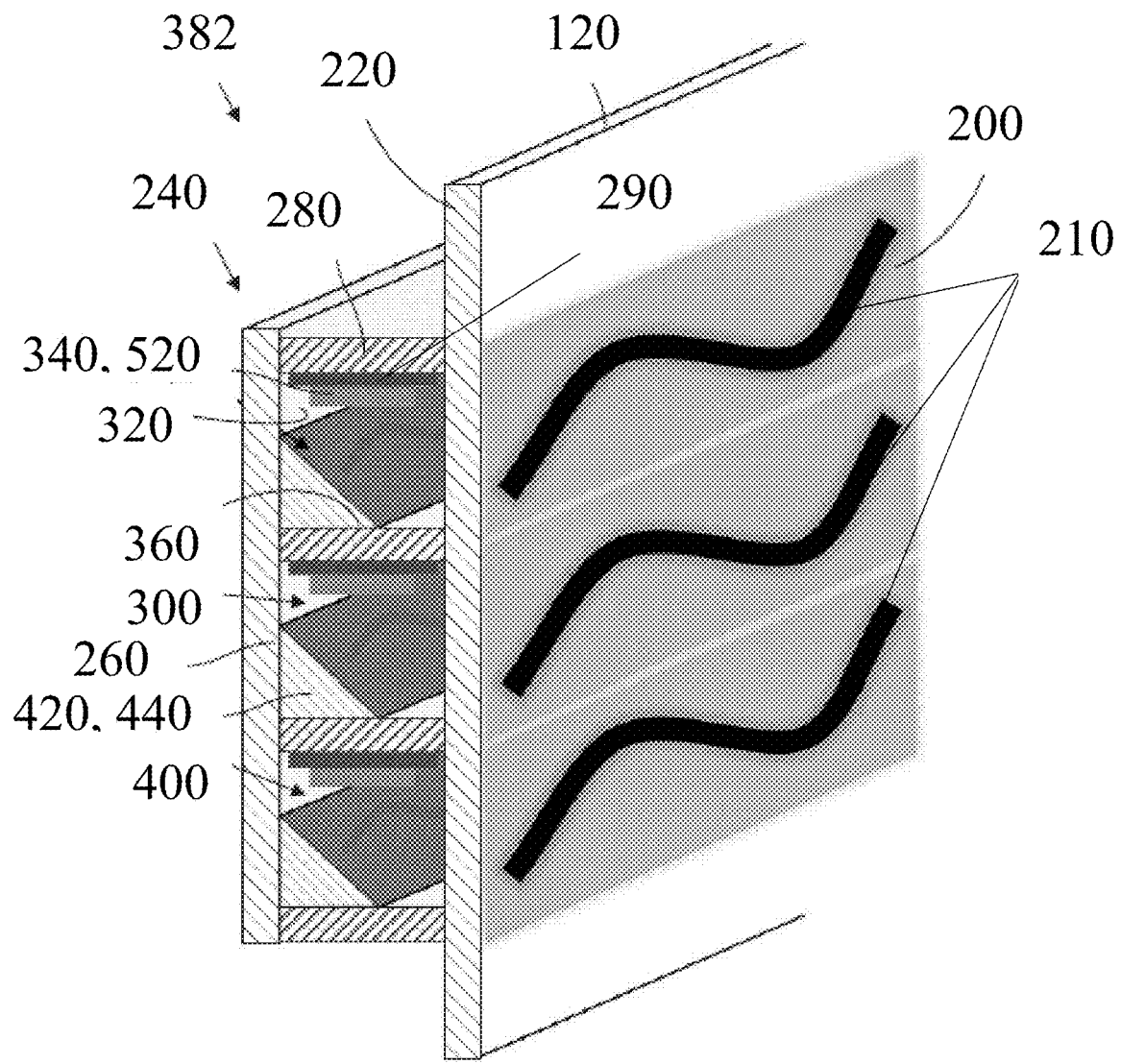
FIG. 9A is a diagram illustrating a second example of an illumination apparatus with an integrated screen surface.
Figure 9B:
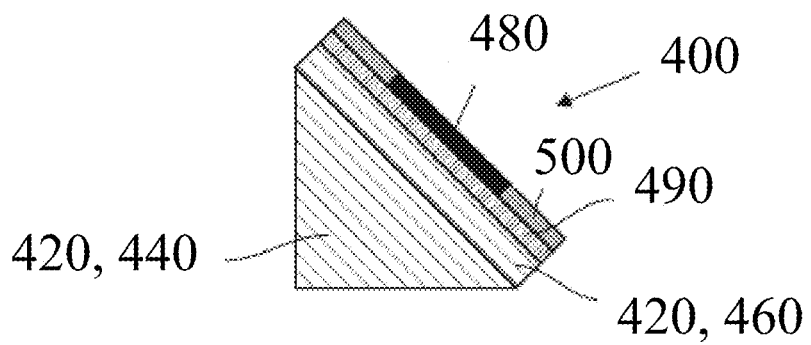
FIG. 9B is a diagram illustrating a separate sectional view, not enlarged to scale, through part of the illumination apparatus shown in FIG. 9A.

FIGS. 9A and 9B show a second example of the illumination apparatus 382 with the chosen representations corresponding to those of FIGS. 8A and 8B. The essential difference between the illumination apparatus 381 according to the first example and the lighting device 382 according to the second example lies in the fact that the optical reflection unit 400 not only has the light-absorbing coating 480 already mentioned for the first example of the lighting device 381, but also a color-changing coating 500 applied to the intermediate layer 490. In this case, the optical reflection unit 400 does not include a reflective surface 320. In the second example of the lighting device 382, the reflective surface 320 is restricted to the rear wall 260. When the light hits the color changing coating 500, light of a certain wavelength range is absorbed more strongly than light of another wavelength range. As a result, light reflected by the color changing coating 500 has a different color than light provided by the illuminant 340. As can be seen from a comparison of FIGS. 8A and 9A, on the visible side 200 in both cases the image resembling a sinusoidal curve is produced, although the two images differ in their colors.

The illuminant 340 can a light emitting diode which provides white light. In another example, the illuminant 340 can also be designed as an RGB-LED 520, which usually includes three light-emitting diodes, of which the first LED provides red light, the second green light and the third blue light. The various LEDs of the RGB-LED 520 can be switched on and off selectively, which allows additional colors to be generated. The image (e.g., pattern, logo, etc.) created on the visible side 200 appears in correspondingly different colors.

Figure 10:
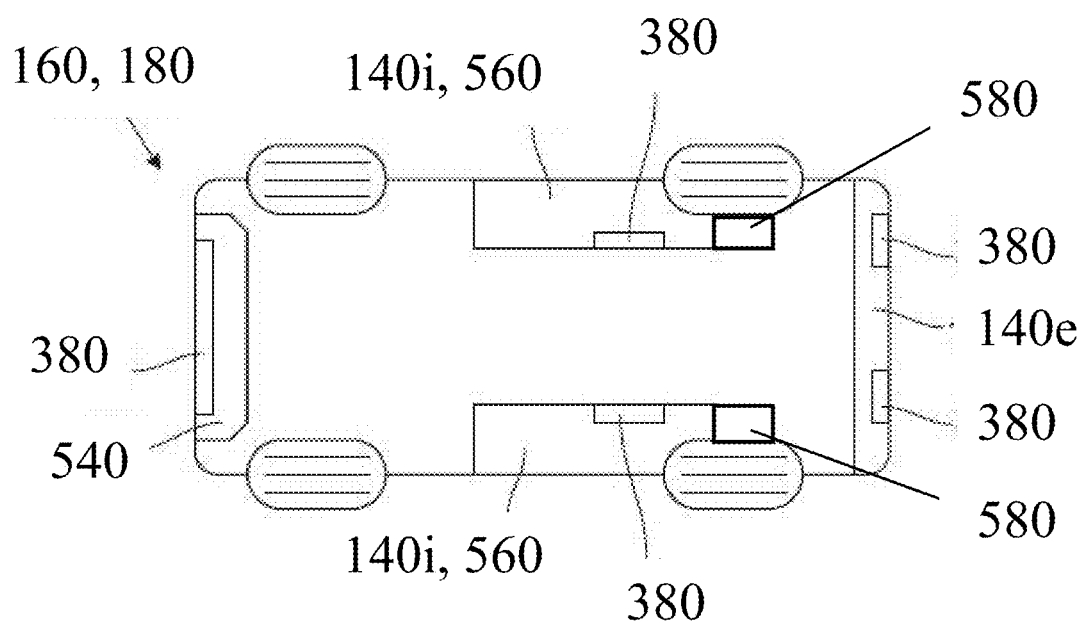
FIG. 10 shows a motor vehicle equipped with one or more illumination apparatuses.

FIG. 10 shows a principal plan view of a vehicle 16, which in this example, is a motor vehicle 18 and has a total of five illumination apparatuses 381, 382. Two of the illumination apparatuses 381, 382 are arranged in an external cladding component 140e, which here is designed as a bumper. A third of the illumination apparatuses 381, 382 is arranged in the tailgate 540 of the motor vehicle 180. The outer surface of the illumination apparatuses 381, 382 form part of the surface of the external cladding component 140e or the tailgate 540. The outer surface connects seamlessly or almost seamlessly to the surrounding surfaces of the motor vehicle 180. Two further illumination apparatuses 381, 382 are each arranged on an internal cladding component 140i which serve as a door cladding 560.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

What is claimed is:

1. An automotive illumination device, comprising:
   an illuminant for emitting light; and
   an optical reflection unit, comprising:
      a reflective surface configured to reflect light emitted from the illuminant, and a mask,
   wherein the optical reflection unit is configured to project an image on a projection surface,
   wherein the mask is configured to change at least one of the frequency and intensity of light reflected from the reflective surface to generate the projected image, and
   wherein the projection surface is a screen.

2. The automotive illumination device of claim 1, where in the projected image comprises at least one of a symbol, a logo, a pattern, and a legend.

3. The automotive illumination device of claim 1, wherein the automotive illumination device is included in a rearview device.

4. The illumination device of claim 1, further comprising:
a second reflective surface disposed at an angle with respect to the reflective surface of the optical reflection unit.

5. The illumination device of claim 4, wherein the reflective surface of the optical reflection unit is disposed at an angle of about 45 degrees with respect to the second reflective surface.

6. The illumination device of claim 1, wherein the reflective surface comprises metalized or internally reflective freeform optics.

7. The illumination device of claim 1, wherein the mask is configured to absorb or scatter light emitted by the illuminant at least within a certain frequency spectrum.

8. The illumination device of claim 7, wherein the mask is a positive mask disposed on the reflective surface in a shape of the image to be displayed on the projection surface.

9. The illumination device of claim 7, wherein the mask is a negative mask disposed on the reflective surface such that un-masked portions of the reflective surface form the image to be displayed on the projection surface.

10. The illumination device of claim 1, wherein the mask is configured to change at least one of the intensity and color of light emitted by the illuminant and reaching the projection surface.

11. The illumination device of claim 1, wherein the reflective surface is at least partly planar or curved.

12. The illumination device of claim 1, wherein the mask is formed together with the reflective surface.

13. The illumination device of claim 1, wherein the mask is at least one of mechanically and electrically alterable or adjustable in order to change the projected image.

14. The illumination device of claim 1, wherein the illuminant emits light with an optical axis parallel to the projection surface.

15. The illumination device of claim 14, wherein the illuminant is attached to a carrier surface perpendicular to the projection surface.

16. The illumination device of claim 15, wherein the mask and reflective surface are included on a carrier element, wherein a cross-section of the carrier element is in the form of a triangle.

17. The illumination device of claim 16, wherein a rectangle in cross-section or a box with four sides of equal geometry is formed by the combination of the carrier surface for the illuminant, the projection surface, a second reflective surface disposed at an angle with respect to the reflective surface of the optical reflection unit, and a lower surface of the carrier element.

18. The illumination device of claim 16, wherein the optical reflection unit comprises the carrier element.

19. The illumination device of claim 1, comprising a plurality of illuminants and a plurality of optical reflection units, wherein each of the plurality of illuminants is associated with one of the plurality of optical reflection units.

20. The illumination device of claim 1, wherein one or more of the optical reflection unit and the mask are detachably mounted.

21. A vehicle unit of a motor vehicle, comprising at least one illumination device according to claim 1.

22. The vehicle unit of claim 21, wherein the at least one illumination device provides a logo lamp, which is adapted to be at least one of moveable relative to the vehicle or attachable to the exterior of the vehicle.

23. The vehicle unit of claim 21, wherein the vehicle unit comprises at least one of an internal or external mirror or camera.

24. A motor vehicle, comprising at least one vehicle unit according to claim 21, wherein the screen surface is comprised by an internal or external cladding component.

25. An automotive illumination device, comprising:
an illuminant for emitting light; and
an optical reflection unit, comprising:
a reflective surface configured to reflect light emitted from the illuminant, and a mask,
wherein the optical reflection unit is configured to project an image on a projection surface,
wherein the mask is configured to change at least one of the frequency and intensity of light reflected from the reflective surface to generate the projected image,
wherein the illuminant emits light with an optical axis parallel to the projection surface and is attached to a carrier surface perpendicular to the projection surface,
wherein the mask and reflective surface are included on the carrier element, and
wherein a cross-section of the carrier element is in the form of a triangle.

26. The illumination device of claim 25, wherein a rectangle in cross-section or a box with four sides of equal geometry is formed by the combination of the carrier surface for the illuminant, the projection surface, a second reflective surface disposed at an angle with respect to the reflective surface of the optical reflection unit, and a lower surface of the carrier element.

27. The illumination device of claim 25, wherein the optical reflection unit comprises the carrier element.

28. The illumination device of claim 25, wherein the projection surface is a screen.

29. The illumination device of claim 25, comprising a plurality of illuminants and a plurality of optical reflection units, wherein each of the plurality of illuminants is associated with one of the plurality of optical reflection units.

30. The illumination device of claim 25, wherein one or more of the optical reflection unit and the mask are detachably mounted.

* * * * *